United States Patent
Park et al.

(10) Patent No.: US 9,030,432 B2
(45) Date of Patent: May 12, 2015

(54) TOUCH PANEL AND PRODUCING METHOD FOR VIA ELECTRODE

(71) Applicant: Samsung Electro-Mechanics Co., Ltd., Suwon (KR)

(72) Inventors: Sung Yeol Park, Suwon (KR); Suk Jin Ham, Suwon (KR); Jung Eun Noh, Suwon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 120 days.

(21) Appl. No.: 13/802,458

(22) Filed: Mar. 13, 2013

(65) Prior Publication Data

US 2014/0184933 A1    Jul. 3, 2014

(30) Foreign Application Priority Data

Dec. 27, 2012    (KR) .................. 10-2012-0154868

(51) Int. Cl.
*G06F 3/041* (2006.01)
*G06F 1/16* (2006.01)
*G06F 3/044* (2006.01)

(52) U.S. Cl.
CPC .............. *G06F 1/169* (2013.01); *G06F 1/1633* (2013.01); *G06F 3/044* (2013.01); *G06F 2203/04103* (2013.01)

(58) Field of Classification Search
None
See application file for complete search history.

(56) References Cited

U.S. PATENT DOCUMENTS

| 6,856,259 B1 | 2/2005 | Sharp |
| 6,995,752 B2 | 2/2006 | Lu |
| 2011/0227846 A1* | 9/2011 | Imazeki ........................ 345/173 |

* cited by examiner

*Primary Examiner* — Muhammad N Edun
(74) *Attorney, Agent, or Firm* — Ladas & Parry, LLP

(57) ABSTRACT

Disclosed herein a touch panel and a producing method for a via electrode. Touch sensitivity may be improved by forming a via hole in a cover glass and then filling a via electrode into the via hole to thereby narrow an interval between a touch point of a user and an electrode layer.

11 Claims, 5 Drawing Sheets

TOUCH PANEL AND PRODUCING METHOD FOR VIA ELECTRODE

CROSS REFERENCE TO RELATED APPLICATION

This application claims the benefit of Korean Patent Application No. 10-2012-0154868, filed on Dec. 27, 2012, entitled "Touch Panel and Producing Method for Via Electrode", which is hereby incorporated by reference in its entirety into this application.

BACKGROUND OF THE INVENTION

1. Technical Field

The present invention relates to a touch panel and a producing method for a via electrode.

2. Description of the Related Art

In accordance with the growth of computers using a digital technology, devices assisting computers have also been developed, and personal computers, portable transmitters and other personal information processors execute processing of text and graphics using a variety of input devices such as a keyboard and a mouse.

While the rapid advancement of an information-oriented society has been widening the use of computers more and more, it is difficult to efficiently operate products using only a keyboard and mouse currently serving as an input device. Therefore, the necessity for a device that is simple, has minimum malfunction, and is capable of easily inputting information has increased.

In addition, current techniques for input devices have progressed toward techniques related to high reliability, durability, innovation, designing and processing beyond the level of satisfying general functions. To this end, a touch panel has been developed as an input device capable of inputting information such as text, graphics, or the like.

This touch panel is mounted on a display surface of an image display device such as an electronic organizer, a flat panel display device including a liquid crystal display (LCD) device, a plasma display panel (PDP), an electroluminescence (El) element, or the like, or a cathode ray tube (CRT) to thereby be used to allow a user to select desired information while viewing the image display device.

This touch panel includes a cover glass, an electrode layer using an indium tin oxide (ITO) as being disposed at a bottom surface of the cover glass, and a display part disposed at a bottom surface of the electrode layer, as well known.

In this configuration, the electrode layer is disposed so that a primary electrode (or an x electrode) and a secondary electrode (or a y electrode) intersect with each other, thereby reading a position due to a change in capacitance generated at a point of contact between the primary electrode and the secondary electrode.

However, in the case of the touch panel according to the prior art as described above, since the touch point of the user and the electrode layer are spaced apart from each other by a thickness of the cover glass due to the cover glass, a touch sensitivity is deteriorate.

Meanwhile, since the touch panel as described above is well known as described in the following patent documents, an overlapped description thereof will be omitted.

PRIOR ART DOCUMENT

Patent Document (Patent Document 1) U.S. Pat. No. 6,856,259
(Patent Document 2) U.S. Pat. No. 6,995,752

SUMMARY OF THE INVENTION

The present invention has been made in an effort to provide a touch panel capable of improving touch sensitivity by forming a via hole to be grooved in a cover glass and then filling a via electrode into the via hole to thereby narrow an interval between a touch point and an electrode layer, and a producing method for the via hole and the via electrode.

According to a preferred embodiment of the present invention, there is provided a touch panel including an electrode layer having a first electrode and a second electrode arranged therein so as to intersect with each other and a cover glass disposed on the electrode layer, the touch pane including: a plurality of via holes grooved at a bottom surface of the cover glass and formed to be spaced apart from each other by a predetermined interval; and a via electrode filled into the via hole and connected to one of the electrodes.

The via hole may have a shape having a width increasing toward the electrode.

The electrode layer or the via electrode may use any one of poly-3,4-ethylenedioxythiophene/polystyrenesulfonate (PEDOT/PSS), polyaniline, polyacetylene, or polyphenylenevinylene.

The electrode layer or the via electrode may use a paste including any one of palladium, platinum, and silver.

The electrode layer or the via electrode may be made of silver (Ag), copper (Cu), aluminum (Al), or a combination thereof.

The electrode layer or the via electrode may be formed of a silver salt emulsion layer.

The electrode layer or the via electrode may use a hybrid silver paste including a silver powder having a diameter of 3 μm to 5 μm and a silver nano-particle having a diameter having 2 nm to 8 nm The via holes may be spaced apart from each other by a predetermined interval to thereby be formed in a closed shape, and may be then processed to be in communication with each other to thereby be formed in an opened shape.

According to another preferred embodiment of the present invention, there is provided a processing method for the via hole of the cover glass as described above, the method including: processing the via hole by irradiating any one of ND-YAG laser, $CO_2$ laser, and semiconductor laser on the cover glass; and forming a via electrode filled into the via hole.

According to another preferred embodiment of the present invention, there is provided a processing method for the via hole of the cover glass as described above, the method including: forming a protrusion part corresponding to the via hole on a hot stamping mold contacting the cover glass; forming the via hole by compressing the cover glass by the hot stamping mold; and forming a via electrode filled into the via hole.

In the forming of the via electrode, a liquid state electrode may be applied onto a surface of the cover glass having the via hole formed therein and a doctor blade may move on the surface of the cover glass, such that the liquid state electrode is filled into the via hole.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
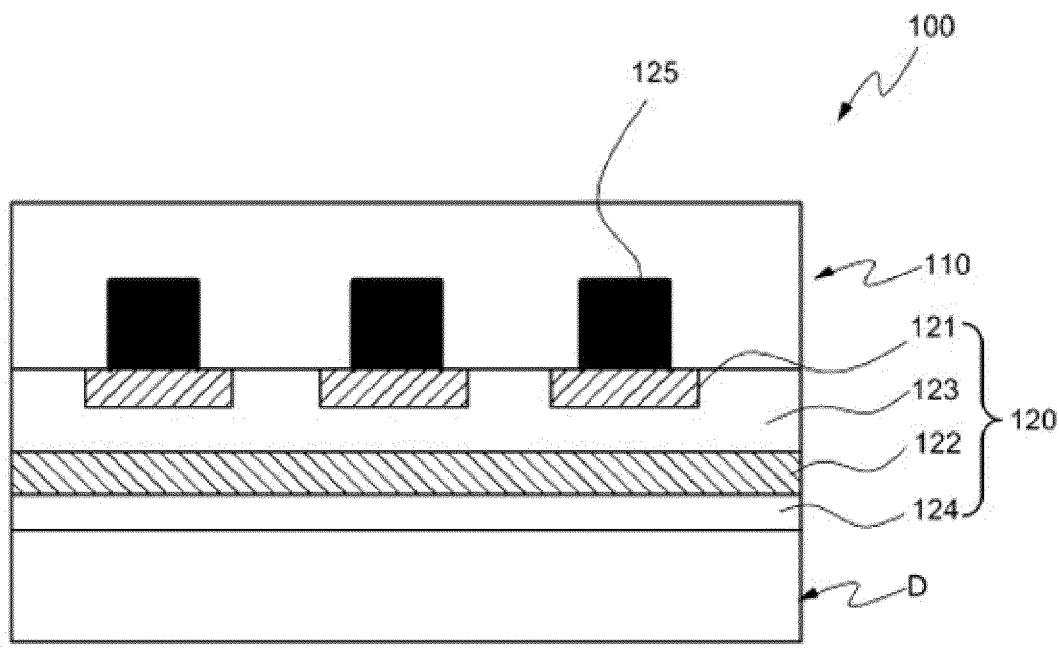
FIG. 1 is a concept view showing a cross-section of a state in which a touch panel including a cover glass having a via hole formed therein and a display part according to a preferred embodiment of the present invention are coupled.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

Figure 2:
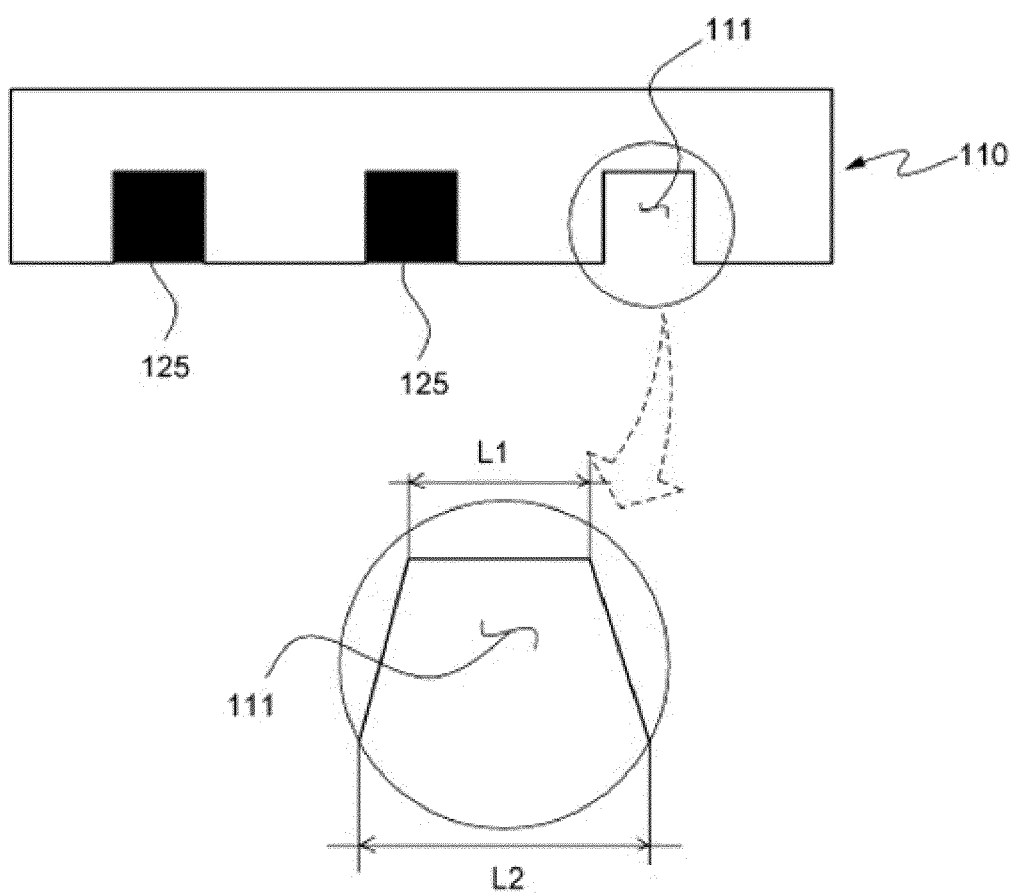
FIG. 2 is a concept view showing only the cover glass having the via hole formed therein according to the preferred embodiment of the present invention.
Figure 3:
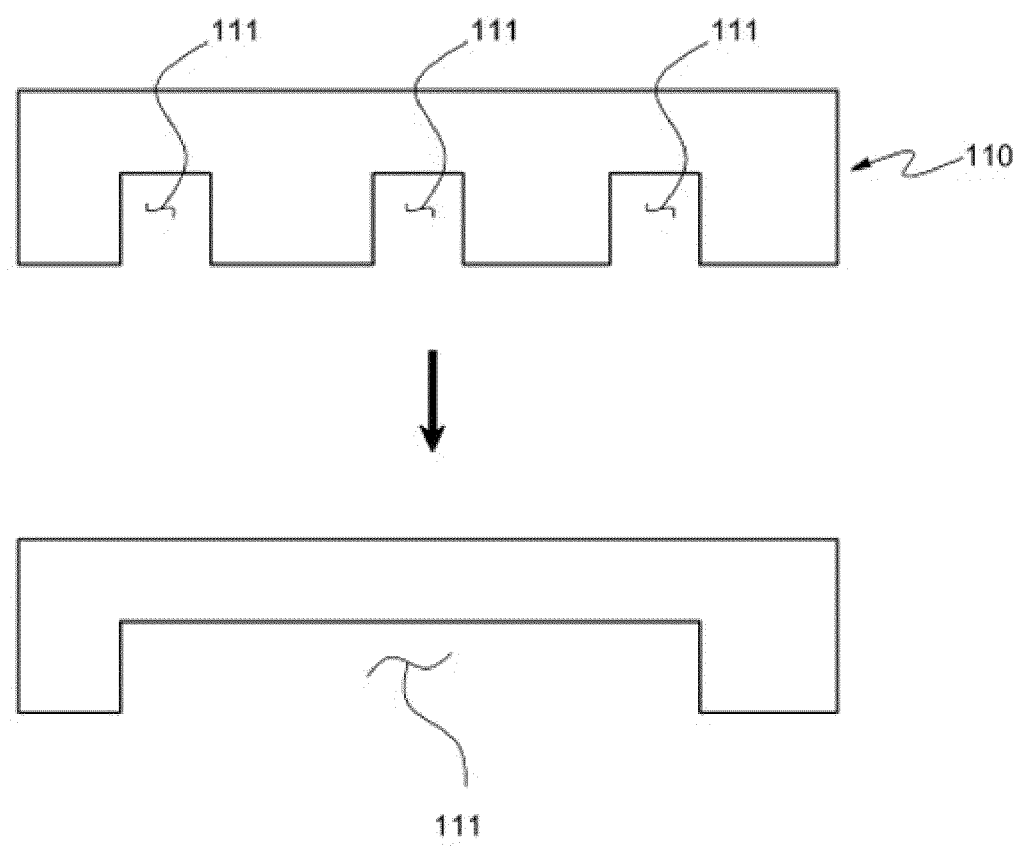
FIG. 3 is a concept view showing a cover glass having a via hole formed therein according to another preferred embodiment of the present invention.
Figure 4:
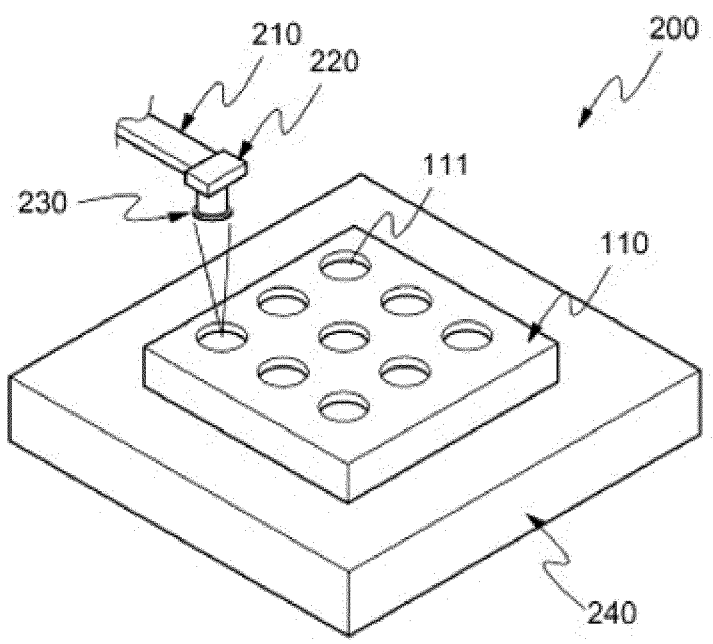
FIG. 4 is a concept view describing a producing method for the via hole according to the preferred embodiment of the present invention using laser.
Figure 5:
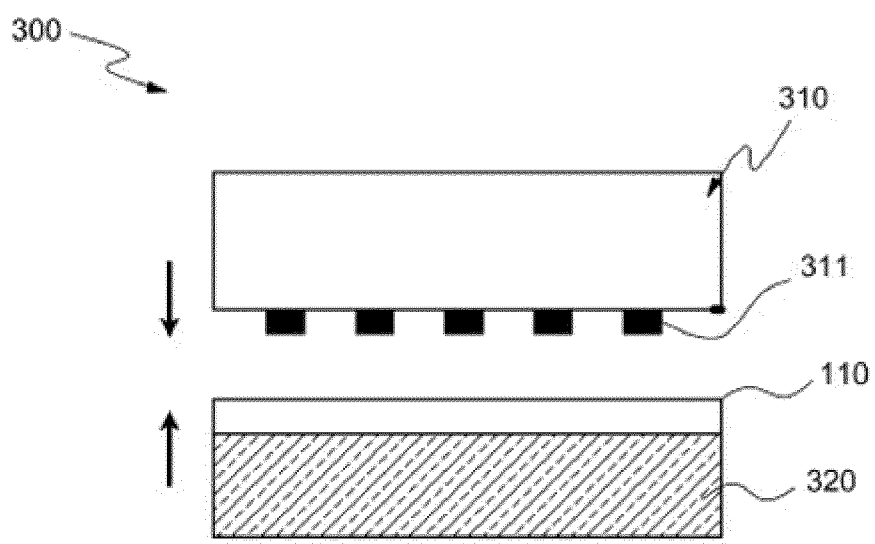
FIGS. 5 and 6 are concept views describing a producing method for the via hole according to the preferred embodiment of the present invention using a hot stamping method.
Figure 6:
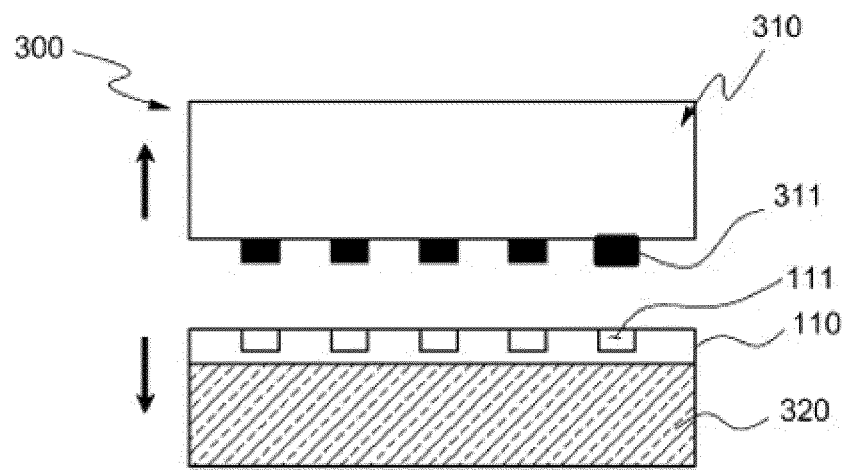
Figure 7:
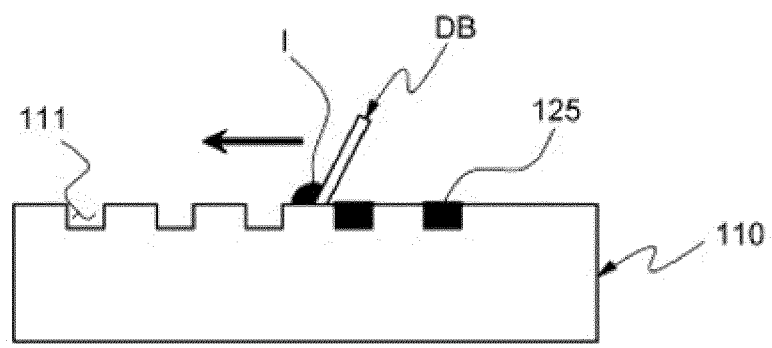
FIG. 7 is a concept view describing a method for filling the via electrode according to the preferred embodiment of the present invention using a doctor blade.

FIG. 1 is a concept view showing a cross-section of a state in which a touch panel including a cover glass having a via hole formed therein and a display part according to a preferred embodiment of the present invention are coupled, FIG. 2 is a concept view showing only the cover glass having the via hole formed therein according to the preferred embodiment of the present invention, FIG. 3 is a concept view showing a cover glass having a via hole formed therein according to another preferred embodiment of the present invention, FIG. 4 is a concept view describing a producing method for the via hole according to the preferred embodiment of the present invention using laser, FIGS. 5 and 6 are concept views describing a producing method for the via hole according to the preferred embodiment of the present invention using a hot stamping method, and FIG. 7 is a concept view describing a method for filling the via electrode according to the preferred embodiment of the present invention using a doctor blade.

The touch panel 100 according to the preferred embodiment of present invention including an electrode layer 120 having a first electrode 121 and a second electrode 122 arranged therein so as to intersect with each other and a cover glass 110 disposed on the electrode layer 120 includes a plurality of via holes 111 grooved at a bottom surface of the cover glass 110 and formed to be spaced apart from each other by a predetermined interval, and a via electrode 125 filled into the via hole 111 and connected to one of the first electrode 111 and the second electrode 122, as shown in FIGS. 1 and 2. In this configuration, in the case in which a display part D is disposed at a lower portion of the electrode layer 120, this is the same configuration as the prior art.

That is, in the case of the cover glass 110 according to the preferred embodiment of the present invention, the via electrode 125 is filled into the via hole 111 of the cover glass 110 and is connected to the electrode. Due to this configuration, a distance between the via electrode 125 and a surface of the cover glass 110 becomes narrower, thereby improving touch sensitivity.

According to the prior art, as described above, the touch sensitivity is lower by a distance by a thickness of the cover glass. However, according to the preferred embodiment of the present invention, since the via electrode 125 is filled, a distance between a touch point by the user and the electrode becomes narrower, thereby improving touch sensitivity.

Meanwhile, although FIG. 1 shows a case in which the via electrode 125 contacts the firs electrode 121, this is only one example for describing the present invention. For example, the second electrode 122 may contact the via electrode 125 and the first electrode 121 may be disposed at a lower portion of the second electrode 122.

Meanwhile, the via hole 111 may have a shape having a predetermined width as shown in FIG. 1 as well as a shape having a width increasing toward the electrode, that is, a lower portion direction in FIG. 2 as shown in an enlarged view of FIG. 2.

That is, the width in the lower portion direction in FIG. 2 is L2 and the width in an upper portion direction is L1, where L2 may be formed to be larger than L1.

Since it is relatively difficult for the via hole 111 to have a predetermined cross-section at the time of processing the via hole 111, the via hole 111 is tapered so that the width is increased toward the electrode as described above in order to increase processing convenience. Due to this shape, an area in which the via hole 111 contacts the via electrode 125 is increased, thereby increasing contact stability.

In addition, the via hole 111 may have various shapes of cross-sections. That is, the via hole 111 may have a circular cross-section or may have a polygonal cross-section such as a quadrangle and a diamond shape. In this point, the via hole 111 according to the preferred embodiment of the present invention is not limited by the shape thereof.

A reference numeral 123 which is not described in FIG. 1 represents a transparent substrate and a reference numeral 124 represents an adhesive layer, and since they are a well know configuration, a detailed description thereof will be omitted.

Meanwhile, the via holes 111 are spaced apart from each other by a predetermined interval, such that they are formed in a closed shape in which they are not in communication with each other as shown in an upper portion of FIG. 3, and are then processed so as to be in communication with each other, such that they may be formed in an opened shape as show in a lower portion of FIG. 3.

As described above, in the case in which the via hole is formed in the opened shape, the via electrode may be more easily filled. In this case, since strength of the cover glass 110 may be decreased, a depth of the via hole should be appropriately maintained.

Meanwhile, the first electrode 121 or the second electrode 122 and the via electrode 125 may be made of a conductive polymer, and more specifically, may be made of poly-3,4- ethylenedioxythiophene/polystyrenesulfonate (PEDOT/PSS), polyaniline, polyacetylene, polyphenylenevinylene, or the like.

In addition, the first electrode 121 or the second electrode 122 and the via electrode 125 may be formed by a general printing process using a paste including any one of palladium, platinum, and silver. In this case, the silver paste is mostly used in the conductive paste due to high conductivity and reliability, but may include palladium or platinum in order to solve problem such as ion migration and the like.

In addition, the first electrode 121 or the second electrode 122 and the via electrode 125 may also use a hybrid silver paste including a silver powder having a diameter of 3 μm to 5 μm and a silver nano-particle having a diameter having 2 nm to 8 nm. Here, the hybrid silver paste includes the above described silver powder and silver nano-particle, and a binder may be prepared by using a thermosetting resin, dispersing the thermosetting resin in an organic solvent, and curing the thermosetting resin under a viscosity condition of 2 Pa·s to 100 Pa·s (180° C. to 220° C.).

In addition, the first electrode 121 or the second electrode 122 and the via electrode 125 may use a carbon paste including carbon black or acetylene black. Here, the above described carbon paste has chemically or physically stable characteristics and inexpensive cost characteristics.

In addition to this, in the case in which the first electrode 121 or the second electrode 122 is formed in a mesh pattern, the electrode may be formed in a pattern formed of a thin metal wire. For example, the electrode pattern may be formed in the mesh pattern using copper (Cu), aluminum (Al), gold (Au), silver (Ag), titanium (Ti), palladium (Pd), chromium (Cr), or a combination thereof. Here, the first electrode 121 or the second electrode 122 may be formed by a plating process or a depositing process using a sputter. Meanwhile, in the case in which the electrode pattern 30 is made of copper (Cu), a surface of the first electrode 121 or the second electrode 122 may be black-oxide treated. Here, the black-oxide treatment indicates treatment in which $Cu_2O$ or $CuO$ is precipitated by oxidizing the surface of the electrode pattern 30, wherein the $Cu_2O$ is brown and is thus referred to as a brown oxide and the $CuO$ is black and is thus referred to as a black oxide. As described above, the surface of the first electrode 121 or the second electrode 122 is black-oxide treated to prevent light from being reflected, thereby making it possible to improve visibility of the touch panel.

Meanwhile, the electrode pattern 30 may also use a metal oxide such as metal silver formed by exposing and developing a silver salt emulsion layer, in addition to the above-mentioned metal, an indium tin oxide (ITO), and the like.

Hereinafter, a method for processing the via hole 111 by laser will be described with reference to FIG. 4.

A laser device 200 for processing the via hole 111 includes an oscillating part 210 oscillating the laser, a scanner 220 irradiating the oscillated laser at a predetermined region, that is, a region at which the via hole 111 is formed, a focusing lens 230 focusing the laser passing through the scanner 220, and a moving stage 240 supporting the cover glass 110 targeted to the processing to move the cover glass 110 in a vertical or horizontal direction.

That is, after the cover glass 110 is disposed on the moving stage 240, the cover glass 110 is processed by the laser device 200, wherein a position of the cover glass 110 is adjusted by the moving stage 240.

In this configuration, since the oscillating part 210, the scanner 220, and the focusing lens 230 are well known configurations, a detailed description thereof will be omitted.

Particularly, the laser may use ND-YAG laser, $CO_2$ laser, semiconductor laser, or the like.

The YAG laser has the oscillating part 210 for oscillating the laser using yttrium, aluminum, and garnet as well known, and the ND YAG laser refers to the laser using neodymium.

In addition, the $CO_2$ laser means gas laser using transition between vibration levels of carbon dioxide ($CO_2$) and are widely used due to high efficiency, and the semiconductor laser refers to laser forming population inversion at a p-n junction part by injecting electron and hole into a p-n junction diode and oscillated by induced emission.

Meanwhile, as described above, the via hole 111 of the cover glass 110 may be processed using the laser, wherein a wavelength of the laser is 200 nm to 400 nm and it is preferable to use the laser having a wavelength of 355 nm.

When the wavelength of the laser is shorter, reactivity is good, but a processing speed is slower due to low energy, conversely, when the wavelength is longer, reactivity is bad, but the processing speed is faster. Therefore, it is preferable to process in the range as described above.

In addition, the cover glass 110 may also form the via hole using a hot stamping method as shown in FIGS. 5 and 6.

That is, a hot stamping mold 300 heated at high temperature compresses the cover glass 110 disposed on the supporting fixture 320, wherein a protrusion part 311 protruded from the hot stamping mold 310 presses the cover glass 110 to form the via hole 111.

Here, in order to taper the via hole 111 as described above, a shape of the protrusion part 311 may also be tapered as shown in drawing correspondingly.

In other words, as shown in FIG. 5, after the cover glass 110 is disposed on the supporting fixture 320, the hot stamping mold 310 having a high temperature is disposed over the cover glass 110. Here, the protrusion part 311 for forming the via hole 111 is protruded from a lower portion side the hot stamping mold 310. Of course, the supporting fixture 320 is also heated at a predetermined temperature, thereby making it possible to maintain the cover glass 110 at the predetermined temperature.

Next, as shown in FIG. 6, the via hole 111 is formed in the cover glass 110 by the protrusion part 311 by descending the hot stamping mold 310, compressing the cover glass 110 by the protrusion part 311, and then separating the hot stamping mold 310 from the cover glass 110.

Meanwhile, when the via hole 111 is formed in the cover glass 110 by the above described method, the via electrode 125 should be formed in the via hole 111. To this end, as shown in FIG. 7, after a liquid state electrode I is applied onto a surface of the cover glass 110 having the via hole 111 formed therein, a doctor blade DB moves on the surface of the cover glass 110, thereby making it possible to fill the liquid state electrode I into the via hole 111.

That is, after the liquid state material I forming the electrode is applied onto the surface of the cover glass 110, the liquid state electrode I is filled into the via hole 111 while the doctor blade DB moves on the surface of the cover glass 110.

Thereafter, the liquid electrode I is formed as the via electrode 125 through a predetermined curing processing.

According to the preferred embodiment of the present invention, a via electrode is formed in a cover glass, such that an interval between a touch point of a user and an electrode layer becomes narrower, thereby making it possible to improve touch sensitivity.

In addition, the sensitivity of the touch panel is improved, thereby making it possible to further improve driving reliability of the touch panel at the time of inputting the touch by the user.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A touch panel including an electrode layer having a first electrode and a second electrode arranged therein so as to intersect with each other and a cover glass disposed on the electrode layer, the touch panel comprising:
   a plurality of via holes grooved at a bottom surface of the cover glass and formed to be spaced apart from each other by a predetermined interval; and
   a via electrode filled into the via hole and connected to one of the electrodes.

2. The touch panel as set forth in claim 1, wherein the via hole has a shape having a width increasing toward the electrode.

3. The touch panel as set forth in claim 1, wherein the electrode layer or the via electrode uses any one of poly-3,4-ethylenedioxythiophene/polystyrenesulfonate (PEDOT/PSS), polyaniline, polyacetylene, or polyphenylenevinylene.

4. The touch panel as set forth in claim 1, wherein the electrode layer or the via electrode uses a paste including any one of palladium, platinum, and silver.

5. The touch panel as set forth in claim 1, wherein the electrode layer or the via electrode is made of silver (Ag), copper (Cu), aluminum (Al), or a combination thereof.

6. The touch panel as set forth in claim 1, wherein the electrode layer or the via electrode is formed of a silver salt emulsion layer.

7. The touch panel as set forth in claim 1, wherein the electrode layer or the via electrode uses a hybrid silver paste including a silver powder having a diameter of 3 μm to 5 μm and a silver nano-particle having a diameter having 2 nm to 8 nm.

8. The touch panel as set forth in claim 1, wherein the via holes are spaced apart from each other by a predetermined interval to thereby be formed in a closed shape, and are then processed to be in communication with each other to thereby be formed in an opened shape.

9. A processing method for the via hole of the cover glass as set forth in claim 1, the method comprising:
   processing the via hole by irradiating any one of ND-YAG laser, $CO_2$ laser, and semiconductor laser on the cover glass; and
   forming a via electrode filled into the via hole.

10. The method as set forth in claim 9, wherein in the forming of the via electrode, a liquid state electrode is applied onto a surface of the cover glass having the via hole formed therein and moves a doctor blade moves on the surface of the cover glass, such that the liquid state electrode is filled into the via hole.

11. A processing method for the via hole of the cover glass as set forth in claim 1, the method comprising:
    forming a protrusion part corresponding to the via hole on a hot stamping mold contacting the cover glass;
    forming the via hole by compressing the cover glass by the hot stamping mold; and
    forming a via electrode filled into the via hole.

* * * * *